United States Patent Office 3,180,875
Patented Apr. 27, 1965

3,180,875
DERIVATIVES OF 3,3'-DITHIOBIS[INDOLE-2-CARBOXYLIC ACID] DIHYDRAZIDES
Jacob Szmuszkovicz, Kalamazoo, Mich., assignor to The Upjohn Company, Kalamazoo, Mich., a corporation of Delaware
No Drawing. Filed Oct. 7, 1963, Ser. No. 314,484
5 Claims. (Cl. 260—319)

The present invention relates to novel organic compounds and more specifically relates to novel 3,3'-dithiobis[1-alkylindole-2-carboxylic acid] dihydrazides, 3,3'-dithiobis[1-alkylindole-2-carboxylic acid] bis(alkylidenehydrazides), and 3,3'-dithiobis[1-alkylindole-2-carboxylic acid] bis(benzylidenehydrazides).

The novel 3,3' - dithiobis[1 - alkylindole-2-carboxylic acid] dihydrazides of the present invention can be represented by the formula:

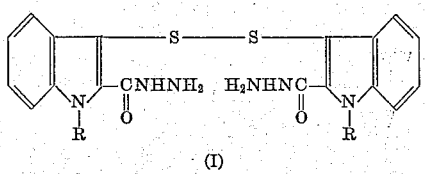

(I)

wherein R is alkyl of 1 to 4 carbon atoms, inclusive, e.g., methyl, ethyl, propyl, isopropyl, butyl, isobutyl, and the like.

The novel 3,3' - dithiobis[1 - alkylindole-2-carboxylic acid] bis(alklyidenehydrazides) and 3,3'-dithiobis[1-alkyl-indole-2-carboxylic acid] bis(benzylidenehydrazides) of the present invention can be represented by the formula:

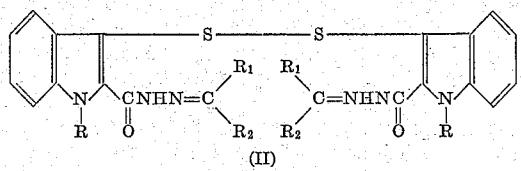

(II)

wherein R has the value represented above, $R_1$ represents hydrogen and alkyl of 1 to 6 carbon atoms, inclusive, and $R_2$ represents alkyl of 1 to 6 carbon atoms, inclusive, and phenyl. Representative alkyls of 1 to 6 carbon atoms include, e.g., methyl, ethyl, propyl, butyl, isopropyl, isobutyl, pentyl, hexyl, and the like.

The novel 3,3' - dithiobis[1 - alkylindole-2-carboxylic acid] dihydrazides of the present invention can be prepared by reacting a 3,3' - dithiobis[1 - alkylindole-2-carboxylic acid] dialkyl ester having the formula:

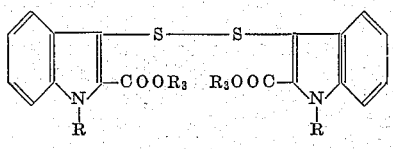

(III)

wherein R has the value represented above, and $R_3$ is alkyl of 1 to 6 carbon atoms, inclusive, e.g., methyl, ethyl, propyl, isopropyl, butyl, isobutyl, pentyl, hexyl, and the like, with hydrazine, preferably in the form of its hydrate. The molar ratio of hydrazine hydrate to the dialkyl ester should be at least 2:1 and preferably is considerably higher, such as from about 5 to about 50 molar equivalents of hydrazine hydrate per molar equivalent of the dialkyl ester. Advantageously, the reaction is carried out within the range of about 75° C. to about 150° C., the reflux temperature of the reaction mixture being satisfactory and convenient.

The novel 3,3' - dithiobis[1 - alkylindole-2-carboxylic acid] bis(alkylidenehydrazides) and 3,3'-dithiobis[1-alkyl-indole-2-carboxylic acid] bis(benzylidenehydrazides) of the present invention can be prepared by reacting a 3,3'-dithiobis[1-alkylindole-2-carboxylic acid] dihydrazide of Formula I with a ketone or aldehyde according to conventional procedures normally utilized to prepare Schiff base derivatives.

Ketones and aldehydes which can be employed have the formula:

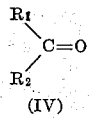

(IV)

wherein $R_1$ and $R_2$ have the values represented above. Representative ketones and aldehydes include, e.g., acetaldehyde, propionaldehyde, isobutyraldehyde, valeraldehyde, 2-methylbutyraldehyde, heptaldehyde, benzaldehyde, butyrophenone, acetone, diethyl ketone, methyl propyl ketone, diisopropyl ketone, methyl sec-butyl ketone, methyl isohexyl ketone, dipentyl ketone, methyl neopentyl ketone, and the like.

The 3,3'-dithiobis[1-alkylindole-2-carboxylic acid] dialkyl esters of Formula III can be prepared by reacting an ester of a 3-(halosulfinyl)-1-alkylindole-2-carboxylic acid having the formula:

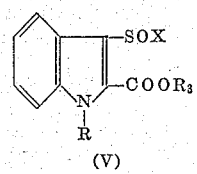

(V)

wherein R and $R_3$ have the values represented above, and X represents halogen, e.g., chlorine and bromine, with hydrazine, preferably anhydrous hydrazine. The molar ratio of hydrazine to ester can range from about 0.75:1 to about 4:1, and preferably is of the order of about 2:1. Advantageously, the reaction is carried out within the range of about −10° C. to about 25° C., in the presence of an inert solvent, e.g., ether, benzene, methylene chloride, and the like. It is pointed out that commercial anhydrous hydrazine frequently contains a small amount of impurity, which will not be detrimental to the reaction except possibly in the matter of yield.

The esters of 3 - (halosulfinyl) - 1-alkylindole-2-carboxylic acids (Formula V) are prepared by reacting an ester of a 1-alkylindole-2-carboxylic acid having the formula:

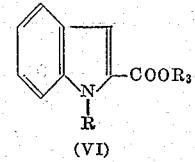

(VI)

wherein R and $R_3$ have the values represented above, with a thionyl halide, e.g., thionyl chloride (preferred) or thionyl bromide, at a temperature between about zero and about 35° C., preferably between about 20° C. and about 30° C. If desired, the reaction can be carried out in the presence of an inert solvent, e.g., ether, benzene, chloroform, methylene chloride, 1,2-dichloroethane, and the like.

Esters of 1-alkylindole-2-carboxylic acids (Formula VI) can be prepared by utilizing the process disclosed by Brehm, J. Amer. Chem. Soc. 71, 3541, 1949, to prepare an indole-2-carboxylic acid ester and then alkylating the indole nitrogen of the indole-2-carboxylic acid ester. Brehm prepared ethyl indole-2-carboxylate by reducing and cyclizing ethyl o-nitrophenylpyruvate with hydrogen in the presence of Adams platinum catalyst. The starting ethyl o-nitrophenylpyruvate was prepared by reacting o-nitrotoluene with diethyl oxalate in accordance with the procedure disclosed by Wislicenus et al., Ann. 436, 45, 1924. By substituting other dialkyl oxalates for diethyl oxalate other suitable esters of o-nitrophenylpyruvic acid which can be utilized herein are prepared. The reduction and cyclization of the pyruvic acid ester can also be accomplished wth zinc dust and acetic acid.

1-alkylation of the indole-2-carboxylic acid esters can be accomplished in known manner by reacting an alkyl halide with the indole-2-carboxylic acid ester in the presence of an alkaline condensing agent such as alkali-metal amides or alkali-metal hydrides.

Esters of 1-alkylindole-2-carboxylic acids (Formula VI) can also be prepared by utilizing the process disclosed by Johnson et al., J. Amer. Chem. Soc. 67, 423, 1945. Johnson et al. prepared methyl 1-methylindole-2-carboxylate and ethyl 1-methylindole-2-carboxylate by cyclizing the 2-methyl-2-phenylhydrazone of pyruvic acid in the presence of an acid medium in accordance with the well-known Fischer indole synthesis, and then esterifying the resulting 1-methylindole-2-carboxylic acid with methanol and hydrogen chloride and ethanol and hydrogen chloride, respectively. This process can also be employed to produce other starting 1-alkylindole-2-carboxylic acid esters by utilizing suitably substituted phenylhydrazines in the preparation of phenylhydrazones of pyruvic acid and employing other alcohols in the esterification step.

The 3,3'-dithiobis[1-alkylindole-2-carboxylic acid] dialkyl esters of Formula III can also be prepared by reacting a 3-(halosulfinyl)-1-alkylindole-2-carbonyl halide having the formula:

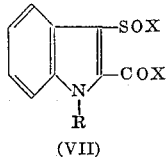

(VII)

wherein R and X have the values represented above, with an alkanol, e.g., methanol, ethanol, propanol, butanol, and the like. The reaction can be carried out by mixing the halide of Formula VII with an excess of the alkanol, heating the mixture for a few minutes to a temperature within the range of between about 50° C. and about 100° C., and allowing the mixture to stand at about 20–30° C. for several hours.

The 3-(halosulfinyl)-1-alkylindole-2-carbonyl halides of Formula VII can be prepared by reacting a 1-alkylindole-2-carboxylic acid having the formula:

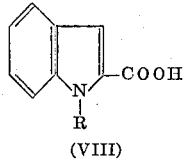

(VIII)

wherein R has the value represented above, with a thionyl halide, utilizing the reaction conditions set forth above for the preparation of esters of 3-(halosulfinyl)-1-alkylindole-2-carboxylic acids (Formula V), except that a higher reaction temperature is employed, advantageously a temperature between about 50° C. and about 110° C., preferably between about 60° C. and about 90° C.

The novel compounds of Formulae I and II are characterized by antifungal activity which renders them useful in various pharmaceutical dosage forms for administration to the animal organism, including birds and mammals, in the form of creams, lotions, ointments, tablets, capsules, pills, granules, powders, solutions, suspensions or sterile injectables, and in agricultural formulations such as dusts, wettable powders, and sprays for application to living plants. Fungal pathogens against which activity has been noted include: *Alternaria solani, Trichophyton rubrum, Trichophyton interdigitale, Histoplasma capsulatum, Sporotrichum schenckii, Hormodendrum campactum,* and *Blastomyces dermatitidis.*

In addition, the novel 3,3'-dithiobis[1-alkylindole-2-carboxylic acid] dihydrazides, 3,3'-dithiobis[1-alkylindole-2-carboxylic acid] bis(alkylidenehydrazides), and 3,3'-dithiobis[1-alkylindole-2-carboxylic acid] bis(benzylidenehydrazides) exhibit high absorption of radiation in the wavelength range of 280–300 millimicrons and accordingly can be employed as effective sun screens when incorporated in suitable vehicles such as transparent film-forming compositions and oils.

The following examples are illustrative of the process and product of the present invention, but are not to be construed as limiting.

EXAMPLE 1

*3,3'-dithiobis[1-methylindole-2-carboxylic acid] bis(isopropylidenehydrazide)*

A. METHYL 1-METHYL-3-(CHLOROSULFINYL)INDOLE-2-CARBOXYLATE

Thionyl chloride (5 ml.) was added to solid methyl 1-methylindole-2-carboxylate (1.89 g.; 0.01 mole). Solution occurred, followed by vigorous evolution of gas and then solidfication. The mixture was allowed to stand for 5 minutes, 15 ml. of anhydrous ether was added, the solid was triturated, filtered, and washed with ether. The solid, methyl 1-methyl-3-(chlorosulfinyl)indole-2-carboxylate, was dried under reduced pressure for 10 minutes, weighed 2.45 g. and melted between 85–88° C. (dec.).

B. 3,3'-DITHIOBIS[1-METHYLINDOLE-2-CARBOXYLIC ACID] DIMETHYL ESTER

Methyl 1-methyl-3-(chlorosulfinyl)indole-2-carboxylate (prepared from 0.8 mole of methyl 1-methylindole-2-carboxylate) was added over a period of 2 hours to a stirred solution of anhydrous hydrazine (51.3 g.; 1.6 moles) in 4.1 of ether while cooling at 5° C. The mixture was then evaporated to dryness under reduced pressure and 500 ml. of water was added. The solid was filtered, washed with water, and crystallized from 4 l. of benzene. The yellow prisms were filtered and washed with methanol to yield 99 g. of 3,3'-dithiobis[1-methylindole-2-carboxylic acid] dimethyl ester which melted between 199–201° C. A second crop amounted to 22 g. Total yield 70%.

C. 3,3'-DITHIOBIS[1-METHYLINDOLE-2-CARBOXYLIC ACID] DIHYDRAZIDE

A mixture of 3,3'-dithiobis[1-methylindole-2-carboxylic acid] dimethyl ester (27.5 g.; 0.0625 mole) and 125 ml. of hydrazine hydrate was refluxed in an oil bath (bath temperature=140° C.) with stirring for one hour. The mixture was allowed to stand for 12 hours and evaporated to dryness on the steam bath under reduced pressure. Methanol (200 ml.) was added to the resulting yellow oil and the solution was stirred for 4 hours, during which time precipitation occurred. The suspension was filtered to yield 18.4 g. of 3,3'-dithiobis[1-methylindole-2-carboxylic acid] dihydrazide which melted between 236.5–238° C. A second crop weighing 2.48 g. was collected after the filtrate stood for 12 hours. Air was then bubbled through the filtrate for 6 hours and 1.15 g. of a third crop was obtained. Total yield: 80%. Ultraviolet spectrum (in 95% ethanol) showed λ max. 219 (46,600); 280 (20,300); 296 (19,200); sh. 344 (6,600).

*Analysis.*—Calcd. for $C_{20}H_{20}N_6O_2S_2$: C, 54.54; H, 4.58; N, 19.08; S, 14.56. Found: C, 54.72; H, 4.10; N, 18.67; S, 14.56.

In the same manner as shown in Parts A, B, and C, 3,3'-dithiobis[1-ethylindole-2-carboxylic acid] dihydrazide, 3,3'-dithiobis[1-propylindole-2-carboxylic acid] dihydrazide, 3,3'-dithiobis[1-butylindole-2-carboxylic acid] dihydrazide, 3,3'-dithiobis[1-pentylindole-2-carboxylic acid] dihydrazide, and 3,3'-dithiobis[1-hexylindole-2-carboxylic acid] dihydrazide were prepared by substituting methyl 1-ethylindole-2-carboxylate, methyl 1-propylindole-2-carboxylate, methyl 1-butylindole - 2 - carboxylate, methyl 1 - pentylindole-2-carboxylate, and methyl 1-hexylindole-2-carboxylate, respectively, for methyl 1-methylindole-2-carboxylate.

D. 3,3'-DITHIOBIS[1-METHYLINDOLE-2-CARBOXYLIC ACID] BIS(ISOPROPYLIDENEHYDRAZIDE)

A mixture of 3,3'-dithiobis[1-methylindole-2-carboxylic acid] dihydrazide (15 g.; 0.0686 mole) and 3 l. of acetone was refluxed for 2.5 hours. The resulting solution was evaporated to about 400 ml. and allowed to cool. The solid, 3,3'-dithiobis[1 - methylindole - 2 - carboxylic acid] bis(isopropylidenehydrazide), amounted to 17.82 g. (99% yield) and melted between 218–220° C. On recrystallization from benzene the product melted between 219–220° C. Ultraviolet spectrum (in 95% ethanol) showed λ max. 219 (46,500); 295 (37,000; sh. 320 (32,800); sh. 372 (6,000).

Analysis.—Calcd. for $C_{26}H_{28}N_6O_2S_2$: C, 59.99; H, 5.42; N, 16.15; S, 12.32. Found: C, 60.18; H, 5.38; N, 15.94; S, 12.37.

EXAMPLE 2

*3,3'-dithiobis[1-methylindole-2-carboxylic acid] bis(benzylidenehydrazide)*

Benzaldehyde (0.53 g.; 5 mmoles) was added to a warm solution of 3,3' - dithiobis[1 - methylindole - 2 - carboxylic acid] dihydrazide (1.05 g.; 5 mmoles) in 15 ml. of dimethylformamide. The solution was heated on the steam bath for 2 hours and evaporated to dryness under reduced pressure. The residue was triturated with hot methanol to yield 1.2 g. of 3,3'-dithiobis[1-methylindole - 2 - carboxylic acid] bis(benzylidenehydrazide) which melted between 220–225° C. On recrystallization from dimethylformamide-methanol the product melted between 222–223° C.

Analysis.—Calcd. for $C_{34}H_{28}N_6O_2S_2$: C, 66.21; H, 4.58; N, 13.62; S, 10.40. Found: C, 66.34; H, 4.60; N, 13.47; S, 10.19.

EXAMPLE 3

*3,3'-dithiobis[1-ethylindole-2-carboxylic acid] bis(ethylidenehydrazide)*

In the same manner as shown in Example 2, 3,3'-dithiobis[1-ethylindole-2-carboxylic acid] bis(ethylidenehydrazide) was prepared by substituting acetaldehyde and 3,3'-dithiobis[1-ethylindole-2-carboxylic acid] dihydrazide for benzaldehyde and 3,3'-dithiobis[1-methylindole-2-carboxylic acid] dihydrazide.

EXAMPLE 4

*3,3'-dithiobis[1-propylindole-2-carboxylic acid] bis(propylidenehydrazide)*

In the same manner as shown in Example 2, 3,3'-dithiobis[1-propylindole-2-carboxylic acid] bis(propylidenehydrazide) was prepared by substituting propionaldehyde and 3,3'-dithiobis[1-propylindole-2-carboxylic acid] dihydrazide for benzaldehyde and 3,3'-dithiobis[1-methylindole-2-carboxylic acid] dihydrazide.

EXAMPLE 5

*3,3'-dithiobis[1-butylindole-2-carboxylic acid] bis(isobutylidenehydrazide)*

In the same manner as shown in Example 2, 3,3'-dithiobis[1-butylindole-2-carboxylic acid] bis(isobutylidenehydrazide) was prepared by substituting isobutyraldehyde and 3,3'-dithiobis[1-butylindole-2-carboxylic acid] dihydrazide for benzaldehyde and 3,3'-dithiobis[1-methylindole-2-carboxylic acid] dihydrazide.

EXAMPLE 6

*3,3'-dithiobis[1-pentylindole-2-carboxylic acid] bis(pentylidenehydrazide)*

In the same manner as shown in Example 2, 3,3'-dithiobis[1-pentylindole-2-carboxylic acid] bis(pentylidenehydrazide) was prepared by substituting valeraldehyde and 3,3'-dithiobis[1-pentylindole-2-carboxylic acid] dihydrazide for benzaldehyde and 3,3'-dithiobis[1-methylindole-2-carboxylic acid] dihydrazide.

EXAMPLE 7

*3,3'-dithiobis[1-hexylindole-2-carboxylic acid] bis(2-methylbutylidenehydrazide)*

In the same manner as shown in Example 2, 3,3'-dithiobis[1-hexylindole-2-carboxylic acid] bis(2-methylbutylidenehydrazide) was prepared by substituting 2-methylbutyraldehyde and 3,3' - dithiobis[1 - hexylindole-2-carboxylic acid] dihydrazide for benzaldehyde and 3,3'-dithiobis[1-methylindole-2-carboxylic acid] dihydrazide.

EXAMPLE 8

*3,3'-dithiobis[1-methylindole-2-carboxylic acid] bis(heptylidenehydrazide)*

In the same manner as shown in Example 2, 3,3'-dithiobis[1-methylindole-2-carboxylic acid] bis(heptylidenehydrazide) was prepared by substituting heptaldehyde for benzaldehyde.

EXAMPLE 9

*3,3'-dithiobis[1-ethylindole-2-carboxylic acid] bis(1-ethylpropylidenehydrazide)*

In the same manner as shown in Example 1, 3.3'-dithiobis[1-ethylindole-2-carboxylic acid] bis(1 - ethylpropylidenehydrazide) was prepared by substituting diethyl ketone and 3,3'-dithiobis[1-ethylindole-2-carboxylic acid] dihydrazide for acetone and 3,3'-dithiobis[1-methylindole-2-carboxylic acid] dihydrazide.

EXAMPLE 10

*3,3'-dithiobis[1-propylindole-2-carboxylic acid] bis(1-methylbutylidenehydrazide)*

In the same manner as shown in Example 1, 3,3'-dithiobis[1-propylindole-2-carboxylic acid] bis(1-methylbutylidenehydrazide) was prepared by substituting methyl propyl ketone and 3,3'-dithiobis[1-propylindole-2-carboxylic acid] dihydrazide for acetone and 3,3'-dithiobis[1-methylindole-2-carboxylic acid] dihydrazide.

EXAMPLE 11

*3,3'-dithiobis[1-butylindole-2-carboxylic acid] bis(1-isopropyl-2-methylpropylidenehydrazide)*

In the same manner as shown in Example 1, 3,3'-dithiobis[1-butylindole-2-carboxylic acid] bis(1-isopropyl-2-methylpropylidenehydrazide) was prepared by substituting diisopropyl ketone and 3,3'-dithiobis[1-butylindole-2-carboxylic acid] dihydrazide for acetone and 3,3'-dithiobis[1-methylindole-2-carboxylic acid] dihydrazide.

EXAMPLE 12

*3,3'-dithiobis[1-pentylindole-2-carboxylic acid] bis(1,2-dimethylbutylidenehydrazide)*

In the same manner as shown in Example 1, 3,3'-dithiobis[1-pentylindole-2-carboxylic acid] bis(1,2-dimethylbutylidenehydrazide) was prepared by substituting methyl sec-butyl ketone and 3,3'-dithiobis[1-pentylindole-2-carboxylic acid] dihydrazide for acetone and 3,3'-dithiobis[1-methylindole-2-carboxylic acid] dihydrazide.

EXAMPLE 13

*3,3'-dithiobis[1-hexylindole-2-carboxylic acid] bis(1,5-dimethylhexylidenehydrazide)*

In the same manner as shown in Example 1, 3,3'-dithiobis[1-hexylindole-2-carboxylic acid] bis(1,5 - dimethylhexylidenehydrazide) was prepared by substituting methyl isohexyl ketone and 3,3'-dithiobis[1-hexylindole-2-carboxylic acid] dihydrazide for acetone and 3,3'-dithiobis[1-methylindole-2-carboxylic acid] dihydrazide.

EXAMPLE 14

*3,3'-dithiobis[1-methylindole-2-carboxylic acid] bis-(1-pentylhexylidenehydrazide)*

In the same manner as shown in Example 1, 3,3'-dithiobis[1-methylindole-2-carboxylic acid] bis(1-pentylhexylidenehydrazide) was prepared by substituting dipentyl ketone for acetone.

EXAMPLE 15

*3,3'-dithiobis[1-methylindole-2-carboxylic acid] bis-(1,3,3-trimethylbutylidenehydrazide)*

In the same manner as shown in Example 1, 3,3'-dithiobis[1-methylindole-2-carboxylic acid] bis(1,3,3-trimethylbutylidenehydrazide) was prepared by substituting methyl neopentyl ketone for acetone.

EXAMPLE 16

*3,3'-dithiobis[1-methylindole-2-carboxylic acid] bis-(1-ethylheptylidenehydrazide)*

In the same manner as shown in Example 1, 3,3'-dithiobis[1-methylindole-2-carboxylic acid] bis(1-ethylheptylidenehydrazide) was prepared by substituting ethyl hexyl ketone for acetone.

I claim:
1. A compound of the formula:

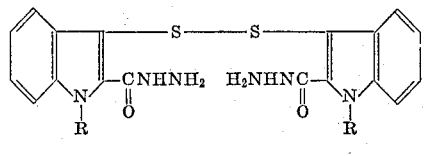

wherein R is alkyl of 1 to 4 carbon atoms, inclusive.

2. A compound of the formula:

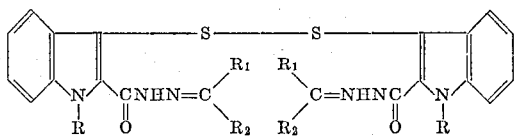

wherein R is alkyl of 1 to 4 carbon atoms, inclusive, $R_1$ is selected from the group consisting of hydrogen and alkyl of 1 to 6 carbon atoms, inclusive, and $R_2$ is selected from the group consisting of alkyl of 1 to 6 carbon atoms, inclusive, and phenyl.

3. 3,3'-dithiobis[1-methylindole-2-carboxylic acid] dihydrazide.

4. 3,3'-dithiobis[1-methylindole-2-carboxylic acid] bis-(isopropylidenehydrazide).

5. 3,3'-dithiobis[1-methylindole-2-carboxylic acid] bis-(benzylidenehydrazide).

References Cited by the Examiner

Gillette et al.: Progress in Drug Research, vol. 6, Birkhauser Verlag, Switzerland, 1963, pages 132–138, p. 7.

Kunari: Chem. Abstracts, vol. 55, 1961, p. 5457, abstract of Nippon Kagaku Zasshi, vol. 80, 1959, page 407.

NICHOLAS S. RIZZO, *Primary Examiner*.